United States Patent
Brown et al.

(10) Patent No.: US 8,121,531 B2
(45) Date of Patent: *Feb. 21, 2012

(54) APPARATUS AND METHOD FOR SELECTIVE INTERFERING WITH WIRELESS COMMUNICATIONS DEVICES

(75) Inventors: Craig S. Brown, Bainbridge Island, WA (US); Joveliano C. Trinidad, Bainbridge Island, WA (US)

(73) Assignee: D3T, LLC, Seattle, WA (US)

( * ) Notice: Subject to any disclaimer, the term of this patent is extended or adjusted under 35 U.S.C. 154(b) by 955 days.

This patent is subject to a terminal disclaimer.

(21) Appl. No.: 12/109,266

(22) Filed: Apr. 24, 2008

(65) Prior Publication Data

US 2008/0268767 A1 Oct. 30, 2008

Related U.S. Application Data

(60) Provisional application No. 60/914,665, filed on Apr. 27, 2007.

(51) Int. Cl.
*H04K 3/00* (2006.01)
(52) U.S. Cl. ....... 455/1; 455/297; 455/238.1; 455/456.1
(58) Field of Classification Search .............. 455/238.1, 455/556.1, 562.1, 569.1–569.2, 575.9, 297, 455/345, 456.4, 456.1, 456.3–456.6, 1
See application file for complete search history.

(56) References Cited

U.S. PATENT DOCUMENTS

| 6,771,946 | B1 | 8/2004 | Oyaski ..................... 455/345 |
| 7,123,874 | B1 | 10/2006 | Brennan ..................... 455/1 |
| 2006/0212195 | A1* | 9/2006 | Veith et al. ................... 701/35 |
| 2007/0072616 | A1* | 3/2007 | Irani .......................... 455/441 |
| 2008/0268768 | A1* | 10/2008 | Brown et al. .................. 455/1 |
| 2008/0268769 | A1* | 10/2008 | Brown et al. .................. 455/1 |
| 2009/0197584 | A1* | 8/2009 | Snow et al. .................. 455/418 |

OTHER PUBLICATIONS

U.S. Appl. No. 12/110,060, filed Apr. 25, 2008, Brown et al.
U.S. Appl. No. 12/110,077, filed Apr. 25, 2008, Brown et al.

* cited by examiner

*Primary Examiner* — Christian Hannon
(74) *Attorney, Agent, or Firm* — Seed IP Law Group PLLC

(57) ABSTRACT

An apparatus operable to disable operation of wireless communications devices, for use within a vehicle, includes a drive circuit coupled to at least one active antenna element to produce interference within at least one wireless communications band of frequencies in response to movement of a vehicle above a defined threshold. The drive circuit being selectively disabled while the vehicle is moving above the defined threshold. The interference may take the form of a bare carrier wave, or may take the form of noise, and is transmitted at sufficient power to interfere with communication between the wireless communications device and a destination device.

71 Claims, 13 Drawing Sheets

APPARATUS AND METHOD FOR SELECTIVE INTERFERING WITH WIRELESS COMMUNICATIONS DEVICES

BACKGROUND OF THE INVENTION

1. Field of the Invention

This disclosure generally relates to the field of wireless communications, and more particularly to wireless communications devices used within vehicles.

2. Description of the Related Art

Wireless communications devices, for example cellular phones, satellite phones, pagers, text messaging devices, personal digital assistants (e.g., BLACKBERRY® and TREO®) and the like are becoming ubiquitous.

Such devices, and in particular cellular phones are currently being used by an increasing number of people while driving. Research studies have shown that cellular phone usage diverts the concentration or attention of the motorist from the road and significantly increases the likelihood of an accident. Some countries as well as several states in the Unites States have banned the usage of hand-held cell phone devices during driving. However, studies indicate that usage of hands-free cellular phones are almost as distracting as hand-held cellular phones. At least one study suggests that hands-free cellular phone usage is almost the equivalent of driving while intoxicated.

Compliance with laws banning cellular phone usage appears to be low, and enforcement requires the diversion of police resources, which may otherwise be used to address other issues. Consequently, a new approach to addressing cellular phone usage in vehicles is therefore desirable.

BRIEF SUMMARY OF THE INVENTION

According to one aspect, an apparatus operable to disable operation of wireless communications devices for use within a vehicle is disclosed that includes at least one active antenna element, and a drive circuit coupled to drive the at least one active antenna element to produce interference within at least one wireless communications band of frequencies in response to movement of a vehicle above a defined threshold, and at sufficient power to interfere with communication between the wireless communications device and a destination device, and a disabling circuit to selectively disable the drive circuit while the vehicle is moving above the defined threshold. The interference may take the form of a bare carrier wave (i.e., a carrier wave with no signal or noise imposed thereon), or may take the form of noise or a carrier wave imposed with noise.

According to another aspect, a method to disable operation of wireless communications devices within vehicles is disclosed that includes determining whether a vehicle is moving above a defined threshold, driving at least one active antenna element to produce interference within at least one wireless communications band of frequencies in response to a determination that the vehicle is moving above the defined threshold, and selectively disabling the driving of the at least one active antenna element to stop the interference while the vehicle is moving above the defined threshold.

According to yet another aspect, an apparatus operable to disable operation of wireless communications devices, for use within a vehicle is disclosed that includes at least one active antenna element, drive means for driving the at least one active antenna element to produce interference within at least one wireless communications band of frequencies in response to movement of a vehicle above a defined threshold, and at sufficient power to interfere with communication between the wireless communications device and a destination device, and disabling means for selectively disabling the drive means while the vehicle is moving above the defined threshold.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the embodiments may be practiced without these details. In other instances, well-known structures, equipment and processes associated with interfering with or jamming wireless communications, including voltage controlled oscillators, tuned circuits (e.g., LC circuits, RLC circuits), noise generators, RF (Radio Frequency) power amplification, antenna transmission and resulting structures have not been shown or described in detail to avoid unnecessarily obscuring the description.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combinable in any suitable manner in one or more embodiments.

The headings provided herein are for convenience only and do not interpret the scope or meaning of the claimed invention.

Figure 1A:
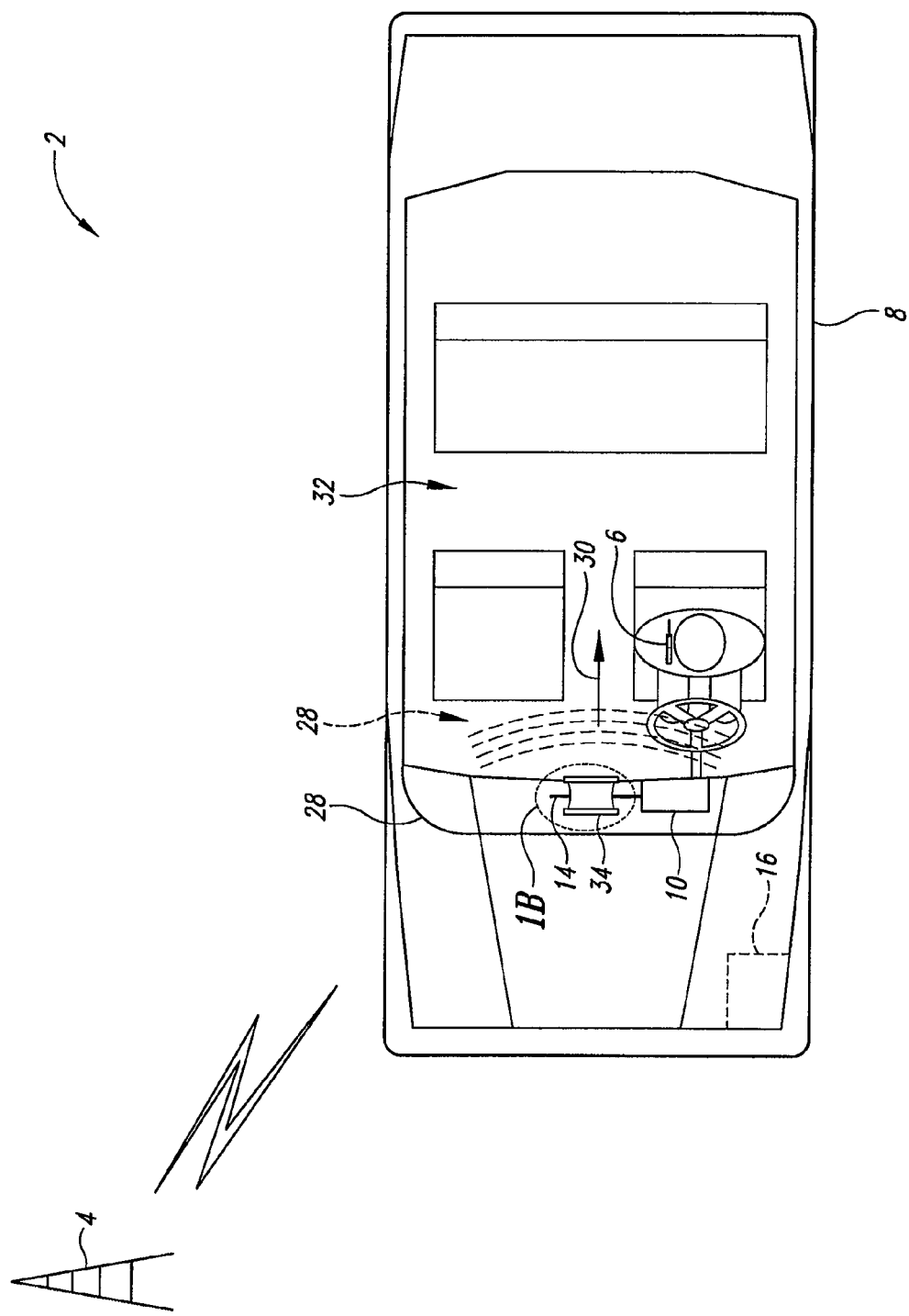
FIG. 1A is a schematic illustration of a communications system including an interference device positioned within a vehicle, according to one illustrated embodiment.

FIG. 1A is a schematic illustration of a communications system 2 as used with a vehicle 8, according to an illustrated embodiment.

The communications system 2 comprises a destination device 4 (e.g., base station) communicatively coupled to a wireless communications device 6 carried by the vehicle 8. An interference device 10 is installed in or otherwise carried by the vehicle 8 or occupant thereof. The interference device 10 is operable to substantially interfere with communication between the destination device 4 and the wireless communications device 6 to a degree sufficient to effectively render the wireless communications device 6 inoperable.

The interference device 10 comprises a drive circuit 12 (FIG. 2) electrically coupled to drive at least one active antenna element 14 to produce interference within at least one wireless communications band of frequencies in response to movement of the vehicle 8 above a defined threshold (e.g., 5 miles per hour, 2.5 miles per hour, etc.). The interference device 10 may transmit a bare carrier wave or noise or undesired signal imposed on a carrier wave within one frequency band or automatically switch between transmission within two or more frequency bands that are likely to be used by the wireless communications device 6, as discussed below. Additionally or alternatively, the interference device 10 may periodically detect the frequency band used by the wireless communications device 6 and adjust itself accordingly.

The destination device 4 may, for example, be a further wireless communications device communicatively coupled to the wireless communications device 6 positioned within the vehicle 8, or a base station responsible for receiving and transmitting electromagnetic signals (e.g., radio frequency signals), for example, within a cellular region in which the wireless communications device 6 is located. The destination device 4 may include a combination of antennas and electronic equipment used to receive and transmit the electromagnetic signals.

The wireless communications device 6 may take a variety of forms, for example, cellular phones, satellite phones, pagers, text messaging devices, personal digital assistants (e.g., BLACKBERRY® and TREO®). The wireless communications device 6 may transmit and receive electromagnetic signals within multiple bands of frequencies such as, for example, a 800 MHZ band, 900 MHz band, an 1800 MHz band, or a 1900 MHz band.

The vehicle 8 may be any suitable structure for transport on land, sea or in air, such as, for example, an automobile, truck, boat, submarine, plane, or helicopter. The vehicle 8 may typically include a sensor 16 such as, for example, a speedometer, tachometer, acceleration sensor or a rotational encoder, to provide a signal indicative of movement of the vehicle 8. The signal may, for example, be indicative of change in position, rate of change in positions and/or rate of change in speed.

Figure 1B:
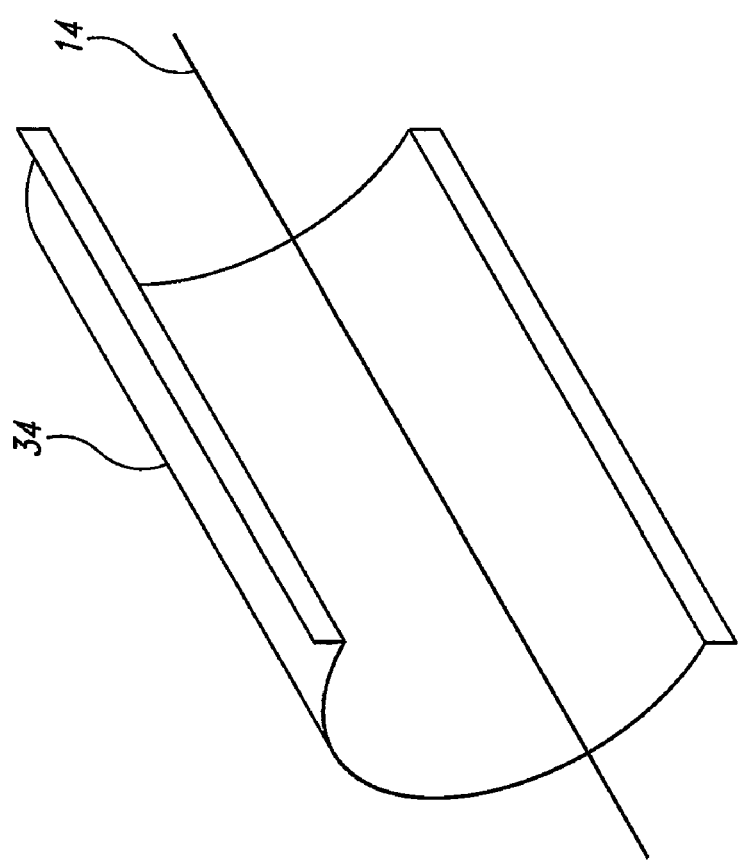
FIG. 1B is a detailed isometric bottom view of an active antenna element and a passive antenna element, according to one illustrated embodiment.

FIG. 1B shows a detailed isometric bottom view of the active antenna element 14 and a passive antenna element 34, according to one illustrated embodiment.

The active antenna element 14 may be a directional antenna element mounted proximate a dashboard 28 of the vehicle 8 (e.g., automobile) with a primary axis 30 of radiation directed into a passenger compartment 32 of the vehicle 8. In another embodiment, the passive antenna element 34 may be positioned with respect to the active antenna element 14 to produce a directional radiation pattern with the primary axis 30 of the directional radiation pattern directed into the passenger compartment 32 of the vehicle 8. The active antenna element 14 and the passive antenna element 34 are mounted proximate the dashboard 28 of the vehicle 8. As illustrated in FIG. 1B, the passive antenna element 34 may be formed as a portion of a cylinder, with a longitudinally extending slot extending a length thereof. The passive antenna element 34 may be inexpensively manufactured by a stamping and rolling process.

Figure 1C:
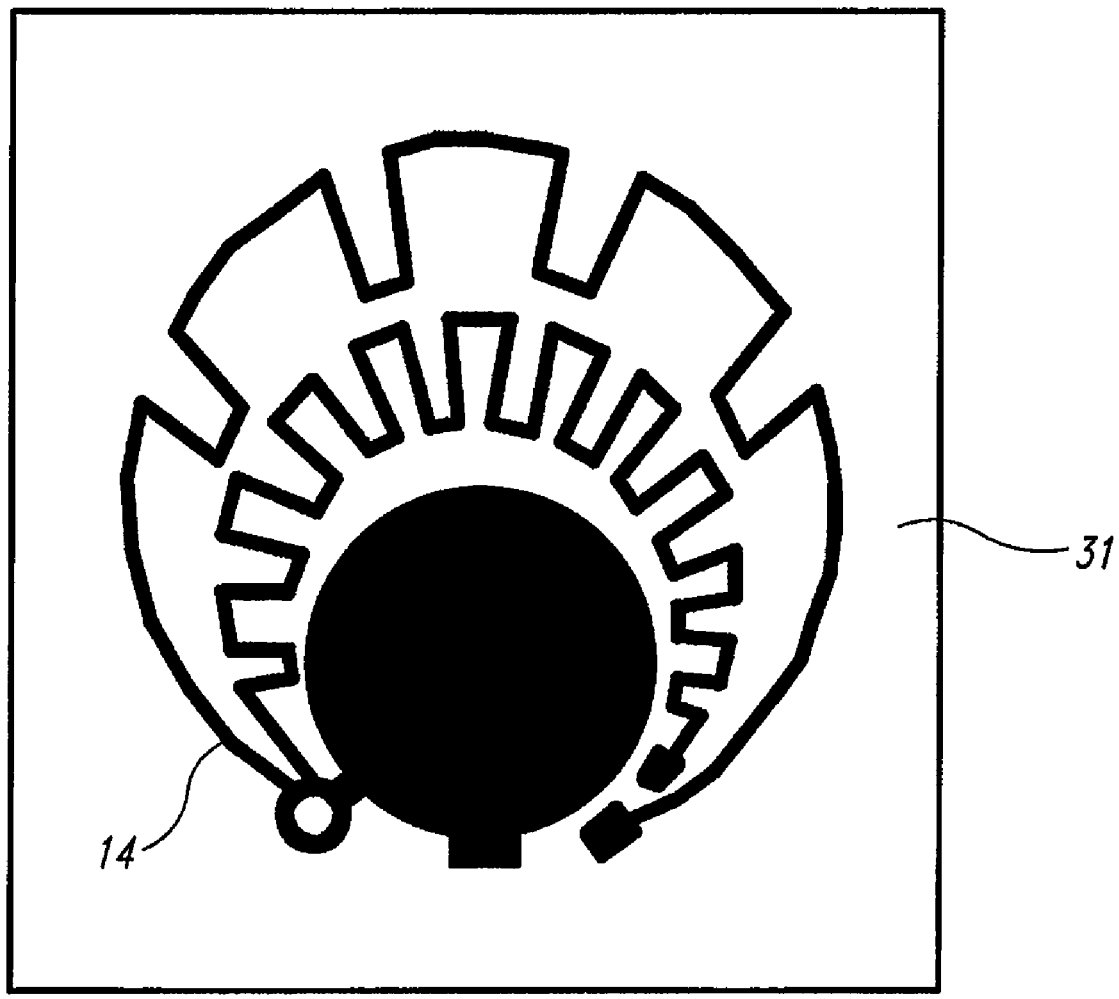
FIG. 1C is a schematic illustration of an active antenna element printed on a printed circuit board, according to one illustrated embodiment.

FIG. 1C shows a schematic illustration of the active antenna element 14 printed on a printed circuit board 31, according to one illustrated embodiment.

The active antenna element 14 may comprise conductive traces printed on a non-conductive substrate such as the printed circuit board 31. The active antenna element 14 may be designed as a dual-response Planar Inverted F-Antenna (PIFA) having a circular antenna design that is omni-directional with a reduced dB gain of approximately a few dB off the active antenna element 14 edges. The printed circuit board 31 with the active antenna element 14 printed thereon may be advantageously mounted perpendicular to the dashboard 26 or similar mountable surface so that the primary axis 30 of radiation may be directed into a driver side of the vehicle 8.

Figure 2:
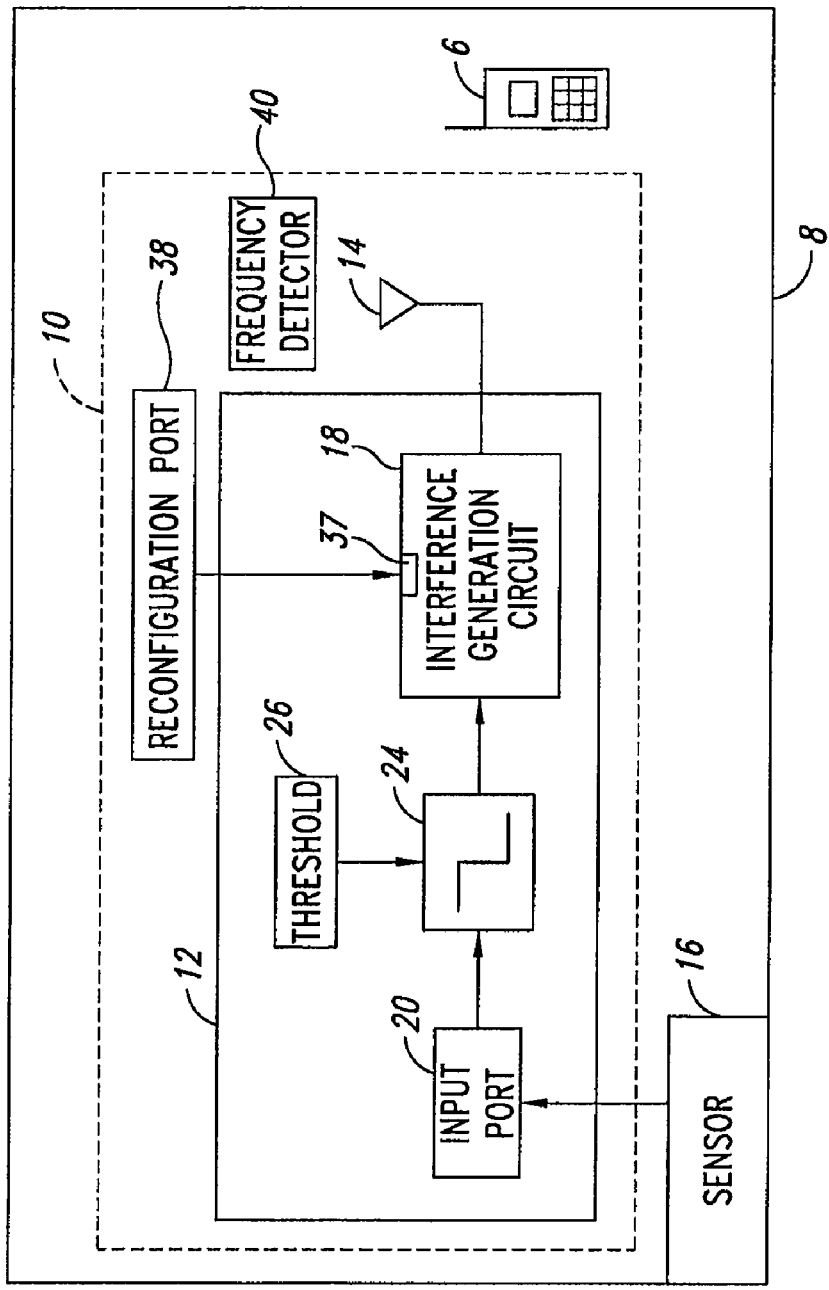
FIG. 2 is a schematic illustration of an interference device positioned within a vehicle, according to one illustrated embodiment.

FIG. 2 is a schematic illustration of the interference device 10 positioned within the vehicle 8, according to an illustrated embodiment.

The drive circuit 12 comprises at least one interference generation circuit 18 configured to cause the at least one active antenna element 14 to transmit interference (e.g., bare carrier wave, noise or undesired signal imposed on carrier wave) within the wireless communications band of frequencies. The frequency of operation of the interference generation circuit 18 may be implemented at manufacture, installation in the vehicle, on startup of the vehicle 8 and/or during use of the interference device 10. More specifically, the interference generation circuit 18 may include at least one variable circuit element 37 (e.g., inductor, capacitor, resistor, etc.) that may be varied according to input signals received via a reconfiguration port 38. The reconfiguration port 38 may receive a user defined input or a generated input based upon an anticipated or a detected frequency of operation of the wireless communications device 6. The reconfiguration port 38 may, for example, receive the user defined input during installation indicative of one or more frequency bands allocated to wireless communications in the geographic region in which the vehicle 8 or interference device 10 will be distributed, sold, operated and/or used. Alternatively, or additionally, the reconfiguration port 38 may for example receive the input generated in response to frequency detection. Such can accommodate new wireless communications devices and/or changes to existing wireless communications devices 6.

The interference generation circuit 18 may be electrically coupled to receive power via an electrical system of the vehicle 8. Alternatively, or additionally the interference generation circuit 18 may receive power via a power supply (e.g., a battery) or plugged into a standard electrical outlet.

The drive circuit 12 may further comprise an input port 20 or a switch 22 (FIGS. 4 and 5) coupled to the sensor 16 to receive the signal indicative of movement of the vehicle 8. A comparator 24 is configured to compare the signal indicative of the movement of the vehicle 8 with a threshold input 26 indicative of the defined threshold, thereby determining whether to trigger the interference generation circuit 18 to produce interference via the active antenna element 14. The threshold input 26 may indicate a user-defined threshold such as, for example, a speed threshold and/or an acceleration threshold and/or a change in position threshold. For example, the speed threshold may be a value indicative of a speed of approximately 5 miles per hour.

Upon determining that the signal received from the sensor 16 is above the defined threshold, the interference device 10 transmits interference via the active antenna element 14 within the wireless communications band of frequencies, which approximately matches the frequency band used by the wireless communications device 6. The interference is transmitted at sufficient power to substantially interfere with communications between the wireless communications device 6 and the destination device 4.

During manufacture, the interference generation circuit 18 may, for example, be configured to produce interference within the following frequency bands: 800 MhZ band, 900 MHz band, 1800 MHz band, or 1900 MHz band. Prior to installation, the interference generation circuit 18 may be manually reconfigured based on the geographic location (e.g., United States, Europe, Japan, etc.) in which the vehicle 8 is sold, leased or operated, to interfere with one or more frequencies licensed for wireless communications in that area. Reducing the number of bands to only the bands that are licensed in the geographic location may advantageously reduce possible unintended interference with other devices, reduce power consumption, and/or comply with applicable laws or regulations.

As mentioned above, the reconfiguration port 38 may receive the generated input based upon the detected frequency of operation of the wireless communications device 6. For example, the drive circuit 12 may include an optional frequency detector 40 (e.g., RF signal analyzer) to detect the wireless communications band of frequencies used by the wireless communications device 6. The variable circuit element 37 of the interference generation circuit 18 is adjusted according to the input received via the reconfiguration port 38. The frequency detector 40 may be enabled at start-up of the vehicle 8 and/or periodically thereafter or at movement of the vehicle 8 above the defined threshold and/or periodically thereafter. The frequency detector 40 may be in constant detection mode irrespective of the movement of the vehicle 8. During enablement of the frequency detector 40 (e.g., at vehicle 8 start up and periodically thereafter), the reconfiguration port 38 receives the generated inputs from the frequency detector 40 indicating the current frequency band being used by the wireless communications device 6. The reconfiguration port 38 adjusts the variable circuit element 37 accordingly, so as to ensure that the generated interference interferes with the operation of the wireless communications device 6.

In another embodiment, the reconfiguration port 38 is programmed to automatically switch the adjustment of the variable circuit element 37 and cause the interference generation circuit 18 to cycle between several frequency bands to render the wireless communications device 6 ineffective without regard to the particular one of the licensed band or bands of frequency in which the particular wireless communications device 6 is operating. The possible frequency bands may be bands licensed for wireless communications in the geographic location in which the vehicle 8 is operated.

The interference generation circuit 18 may include a tuned circuit (e.g., RLC circuit, LC circuit, etc.) with a interference generator coupled thereto. The interference generator provides interference within one or more wireless communications bands of frequencies. The tuned circuit passes interference within the wireless communications band of frequencies that approximately matches the band of frequencies used during operation of the wireless communications device 6. The tuned circuit may include the variable circuit element 37 to allow for the selection of the new band of frequencies that approximately matches the wireless communications band of frequencies used during operation of the wireless communications device 6. The variable circuit component may be, for example, a varicap diode, integrated within the tuned circuit to form a voltage controlled oscillator (VCO). The varicap diode is a diode having a large depletion region that may be varied by an applied voltage, thereby functioning as a variable capacitor. The interference generation circuit 18 may further comprise an amplification circuit to increase the power of the transmitted interference. The amplification circuit provides sufficient power such that the transmitted interference interferes with the communication between the wireless communications device 6 and the destination device 4.

Figure 3:
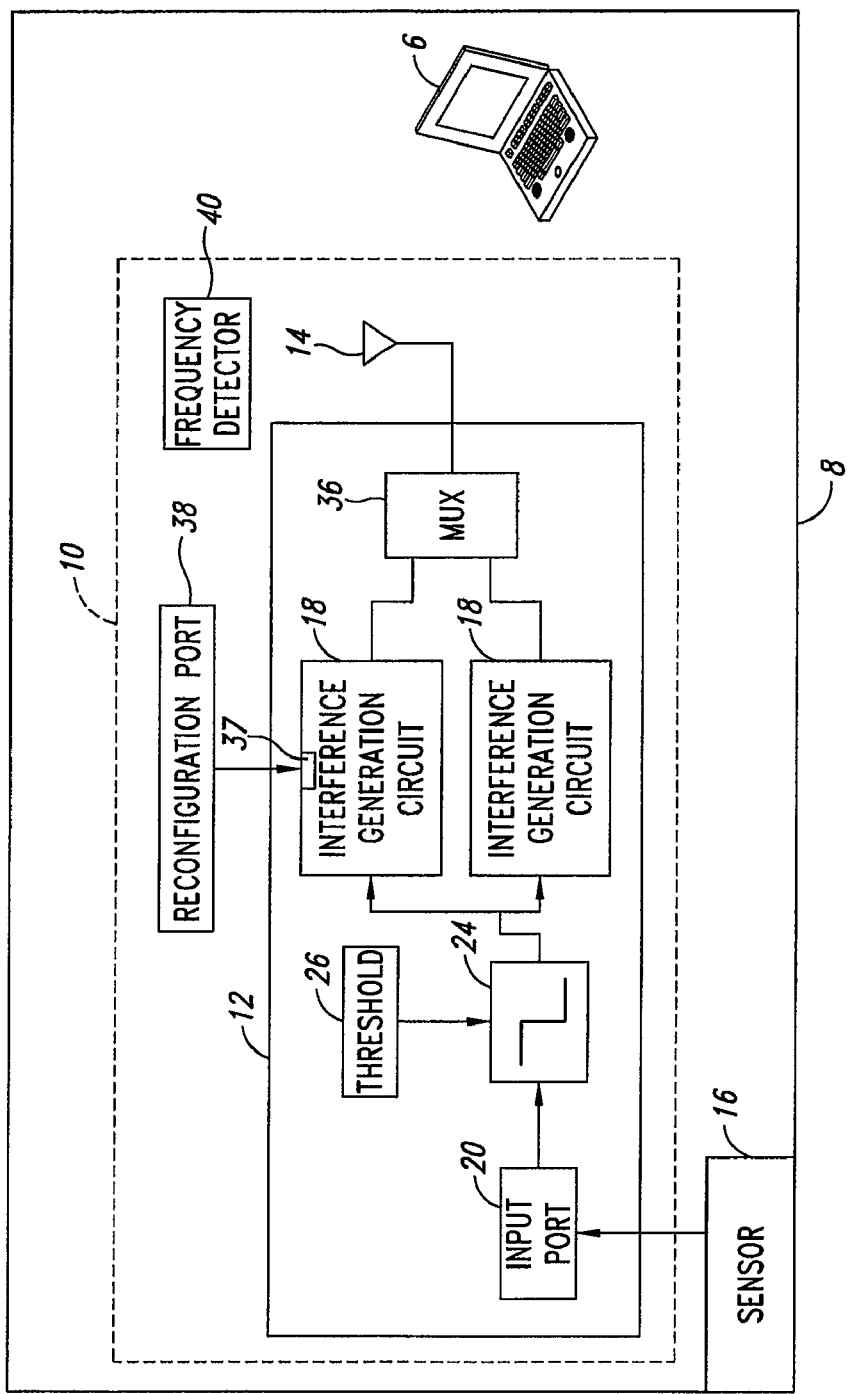
FIG. 3 is a schematic illustration of an interference device positioned within a vehicle including at least two interference generation circuits and a comparator, according to one illustrated embodiment.

FIG. 3 shows a schematic illustration of the interference device 10 positioned within the vehicle 8 and including at least two interference generation circuits 18*a*, 18*b* (collectively referenced as 18), the comparator 24 and a multiplexer 36, according to an illustrated embodiment.

The drive circuit 12 of FIG. 3 is similar in some respects to the drive circuit 12 of FIG. 2. Hence, identical or similar elements or components will be identified by the same reference numbers. Only significant differences in structure and operation are discussed below.

The multiplexer 36 is operable to selectively couple a respective one of the at least two interference generation circuits 18 to the active antenna element 14 at a time. Each of the at least two interference generation circuits 18 is operable to cause the active antenna element 14 to produce interference within a respective wireless communications band of frequencies. For example, the drive circuit 12 may include three interference generation circuits 18, wherein each is operable to cause the active antenna element 14 to produce interference within a respective one of three wireless communications bands of frequencies. The three bands of frequencies may include, for example, the 800 MhZ band, 900 MHz band, 1800 MHz band and the 1900 MHz band, as configured during manufacture or installation of the interference device 10.

The comparator 24 may trigger one or more of the interference generation circuits 18 to generate an interference signal based on the signal indicative of movement of the vehicle 8 and on the threshold input 26. The interference signal is supplied to a respective input of the multiplexer 36. The multiplexer 36 selects the respective input corresponding to the interference generation circuit 18, to cause the active antenna element 14 to produce interference within the wireless communications band of frequencies that approximately matches the frequency band used by the wireless communications device 6.

In some embodiments, the drive circuit 12 may include the frequency detector 40 that detects the frequency band or bands in which the wireless communications device 6 is operating and supplies an appropriate signal to the multiplexer 36 to cause the multiplexer 36 to select the respective input. The respective input corresponds to the interference generation circuit 18 designed to produce interference within the wireless communications band of frequencies that approximately matches the frequency band used by the wireless communications device 6. Similarly to the interference device 10 of FIG. 2, the frequency detector 40 may be enabled at start-up of the vehicle 8 and/or periodically thereafter or at movement of the vehicle 8 above the defined threshold and/or periodically thereafter. The frequency detector 40 may be in constant detection mode irrespective of the movement of the vehicle 8. During enablement of the frequency detector 40 (e.g., at vehicle 8 start up and/or periodically thereafter), the multiplexer 36 receives the signals from the frequency detector 40 to cause the multiplexer 36 to select the respective input. The respective input corresponding to the interference generation circuit 18 designed to produce interference to interfere with the current frequency band being used by the wireless communications device 6.

During manufacture, each of the interference generation circuits 18 may, for example, be configured to produce interference within the 800 MHz, 900 MHz, 1800 MHz or 1900 MHz bands, respectively. However, prior to installation, the multiplexer 36 may be manually set based on the geographic location (e.g., United States, Europe, Japan, etc.) in which the vehicle is sold, leased or operated, to select the input corresponding to the interference signal that can interfere with one or more frequencies licensed for wireless communications in that area.

Alternatively, the multiplexer 36 may be preprogrammed to automatically cycle selection between two or more inputs, effectively rendering the wireless communications device 6 ineffective without regard to the particular one of the licensed band or bands of frequency in which the particular wireless communications device 6 is operating. The two or more inputs may correspond to interference signals within respective frequency bands licensed for wireless communications in the geographic location in which the vehicle 8 is operated.

Similarly to the drive circuit 12 of FIG. 2, if neither of the interference generation circuits 18 produce interference within the frequency band used by the wireless communications device 6, the variable circuit element 37 of one of the interference generation circuits may be adjusted. The reconfiguration port 38 may receive the user defined input (e.g., during installation) or the generated input based upon the detected frequency of operation of the wireless communications device 6. The reconfiguration port 38 may, for example, receive the user defined input during installation or the generated input during frequency detection.

Figure 4:
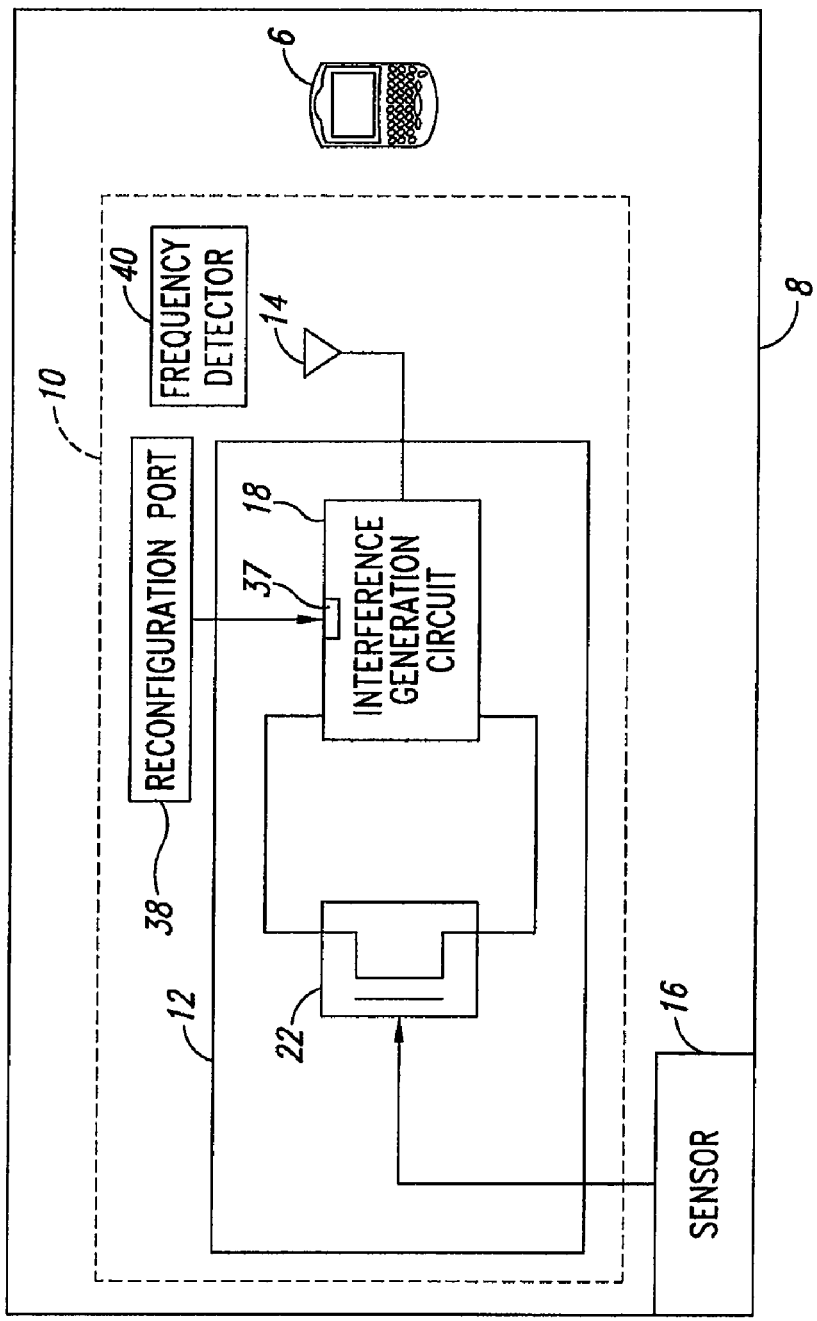
FIG. 4 is a schematic illustration of an interference device positioned within a vehicle including at least one interference generation circuit and a switch, according to one illustrated embodiment.
Figure 5:
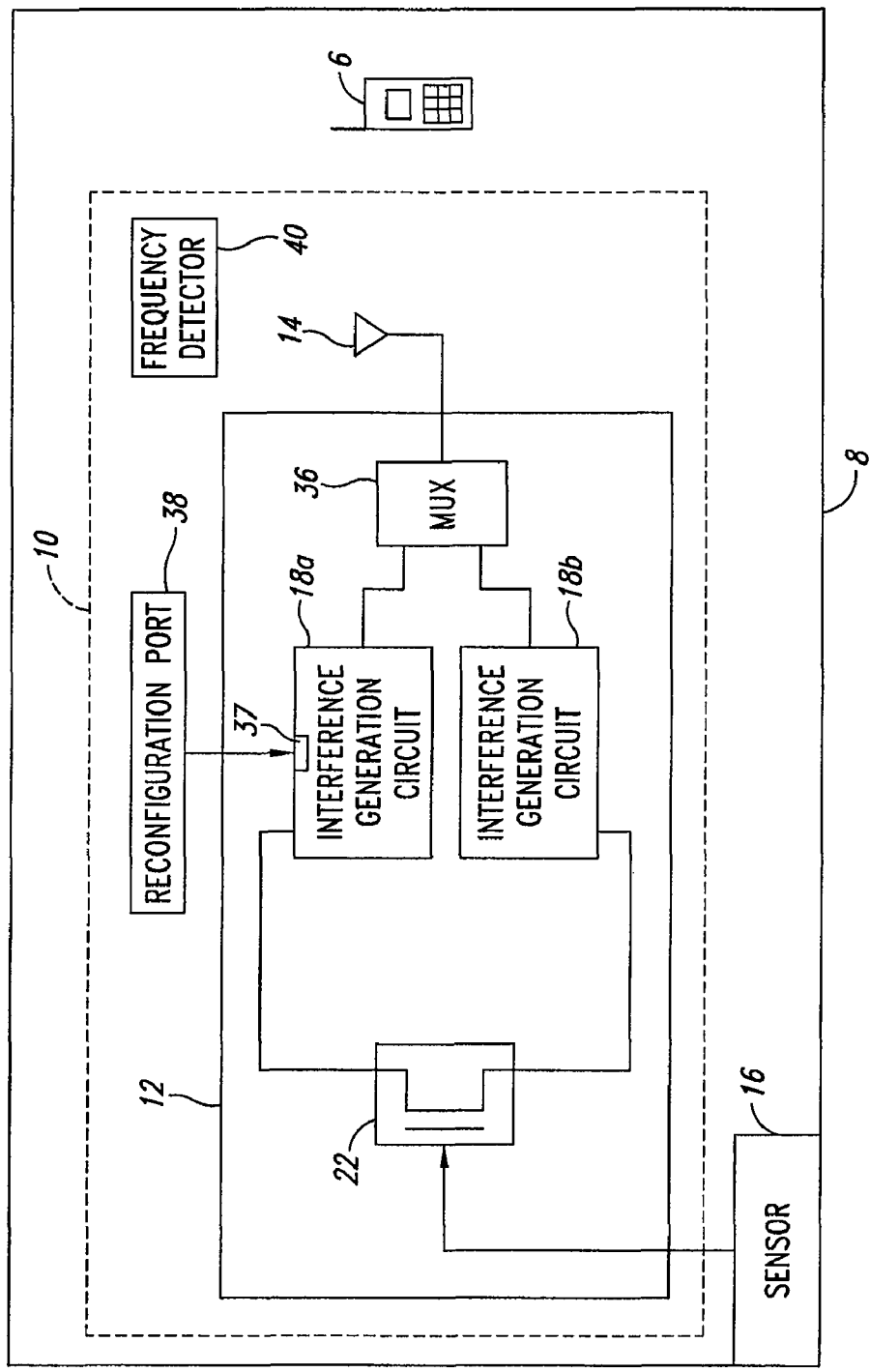
FIG. 5 is a schematic illustration of an interference device positioned within a vehicle including at least two interference generation circuits and a switch, according to one illustrated embodiment.

FIG. 4 shows a schematic illustration of the interference device 10 including the at least one interference generation circuit 18 coupled to the switch 22 positioned within the vehicle 8, according to one illustrated embodiment. FIG. 5 shows a schematic illustration of the interference device 10 including the at least two interference generation circuits 18 coupled to the switch 22 positioned with the vehicle 8, according to another illustrated embodiment.

The drive circuit 12 of FIGS. 4 and 5 is similar in some respects to the drive circuit 12 of FIGS. 2 and 3, respectively. Hence, identical or similar elements or components will be identified by the same reference numbers. Only significant differences in structure and operation are discussed below.

As illustrated in FIG. 4, the drive circuit 12 may comprise the switch 22 responsive to the signal indicative of movement of the vehicle 8 above the defined threshold. The switch 22 selectively couples the interference generation circuit 18 to the at least one active antenna element 14 to produce interference within the at least one wireless communications band of frequencies. The switch 22 closes and creates an electrical path when the signal indicative of movement of the vehicle 8 exceeds the defined threshold. The defined threshold may, for example, be set by the resistance of a gate resistor coupled to the switch 22. In at least one embodiment, the circuit may be designed such that a voltage drop across the switch 22 (e.g., transistor) sets the threshold. The switch 22 may be a digital switch having design features that define the turn-on threshold indicative of the defined threshold. The switch 22 may be, for example, a Metal Oxide Field Effect Transistor (MOSFET), Bipolar Junction Transistor (BJT), Metal Oxide Semiconductor (MOS) transistor, Complimentary Metal Oxide Semiconductor (CMOS) transistor, or any suitable transistor.

The switch 22 is electrically coupled to the sensor 16 to receive the signal indicative of movement of the vehicle 8. The movement of the vehicle 8 may, for example, be a change of position, speed or acceleration of the vehicle 8. The signal indicating the movement of the vehicle 8 may take the form of a voltage or a current being applied to the switch 22. When the signal is above the turn-on threshold the switch 22 is in an ON or CLOSED state. When the signal applied to the switch 22 is below the turn-on threshold, the switch 22 is in an OFF or OPENED state so as to disconnect the interference generation circuit 18 and prevent the transmission of the interference within the wireless communications band of frequencies.

As described in FIG. 3, the drive circuit 12 may comprise at least two interference generation circuits 18 coupled to the multiplexer 36 and operable to selectively couple the respective one of the at least two interference generation circuits 18 to the active antenna element 14 at a time. Each of the at least two interference generation circuits 18 is operable to cause the active antenna element 14 to produce interference within the respective wireless communications band of frequencies. Referring to FIG. 5, the at least two interference generation circuits 18 are coupled to the switch 22. Based on the signal received from the sensor 16, the switch 22 may trigger each of the at least two interference generation circuits 18 to provide interference signals to the respective inputs of the multiplexer 36. The multiplexer 36 couples the respective input corresponding to the interference generation circuit 18 designed to cause the active antenna element 14 to produce interference within the wireless communications band of frequencies that approximately matches the frequency band used by the wireless communications device 6.

Similarly to the drive circuit 12 described in FIGS. 2 and 3, the interference generation circuit 18 may include at least one variable circuit element 37 that may be adjusted according to the signal received at the reconfiguration port 38.

Figure 6:
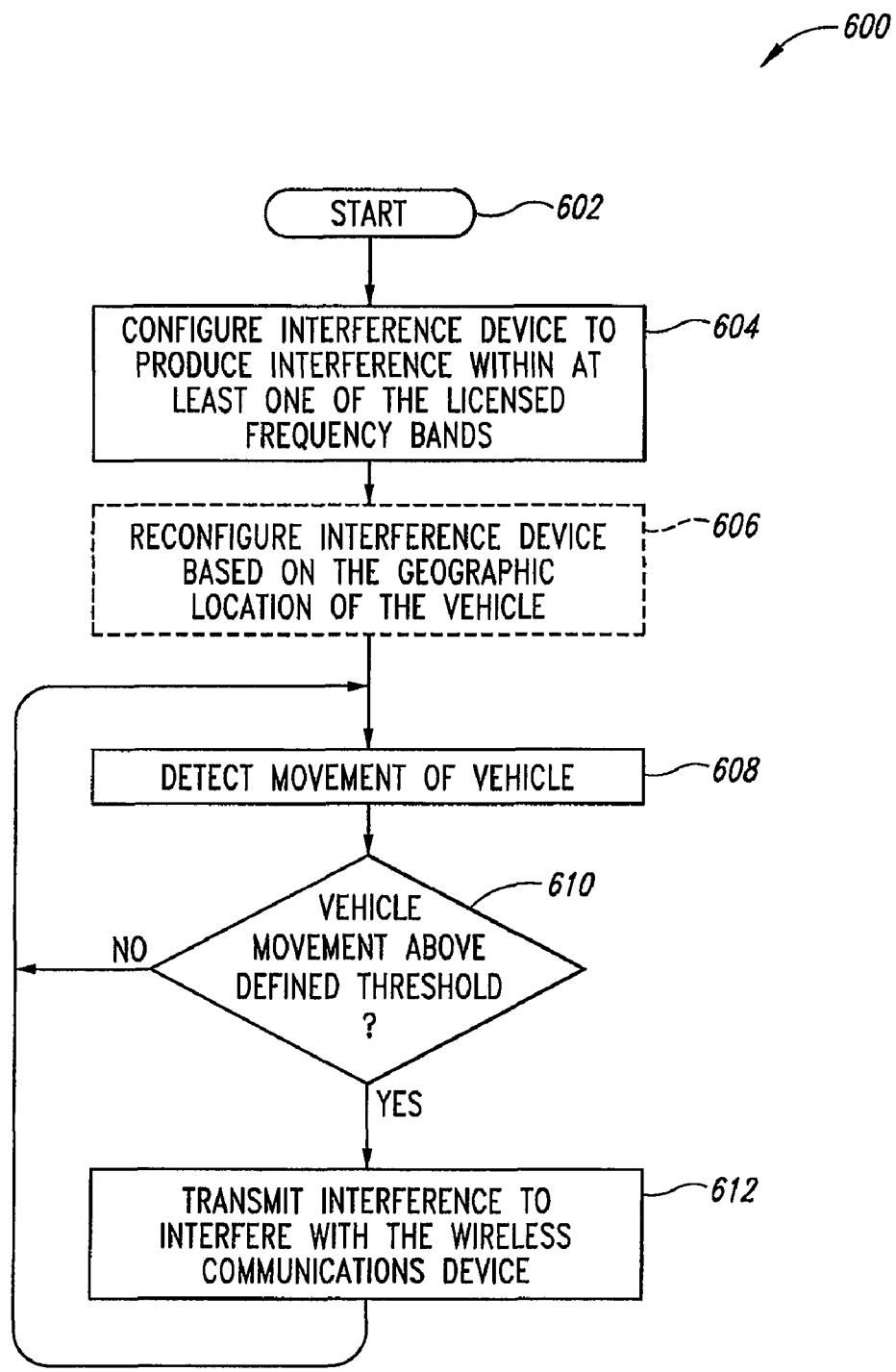
FIG. 6 is a flowchart of a method of disabling operation of wireless communications devices within the vehicle, according to one illustrated embodiment.

FIG. 6 shows a flowchart of a method 600 of disabling operation of the wireless communications device 6 within the vehicle, according to one illustrated embodiment.

The method 600 starts at 602, for example in response to the start of manufacture of the interference device 10. At 604, the interference device 10 is configured to produce interference within at least one of the frequency bands licensed for wireless communications in the geographic region in which the interference device 10 will be distributed, sold and/or used.

Optionally at 606, prior to installation of the interference device 10, the interference generation circuit 18 is manually configured based on the geographic location (e.g., Unites States, Europe, Japan, etc.) in which the vehicle 8 is sold, leased or operated, to interfere with one or more frequencies licensed for wireless communications in that area.

At 608, in response to the starting up or movement of the vehicle 8, the sensor 16 sends the signal indicative of the movement of the vehicle 8 to the drive circuit 12. The signal may be indicative of position, speed and/or acceleration of the vehicle 8 or a component thereof, for example, a drive shaft or axle.

At 610, at least one of the comparator 24 or the switch 22 determines whether the movement of the vehicle 8 exceeds the defined threshold. As discussed above, the threshold may be defined via the threshold input 26 or the turn-on threshold of the switch 22. The signal indicative of the movement of the vehicle 8 is compared to the defined threshold. If it is determined that the vehicle 8 is moving below the defined threshold, control passes back to 608.

At 612, the interference device 10 transmits interference within the at least one wireless communications band of frequencies that approximately matches the frequency band used by the wireless communications device 6.

The method 600 passes control to 608 and waits for the signal indicative of the movement of the vehicle 8 to be above the defined threshold.

It will be apparent to those of skill in the art, that the acts of the method 600 may be performed in a different order. It will also be apparent to those with skill in the art, that the method 600 omits some acts and/or may include additional acts.

Figure 7:
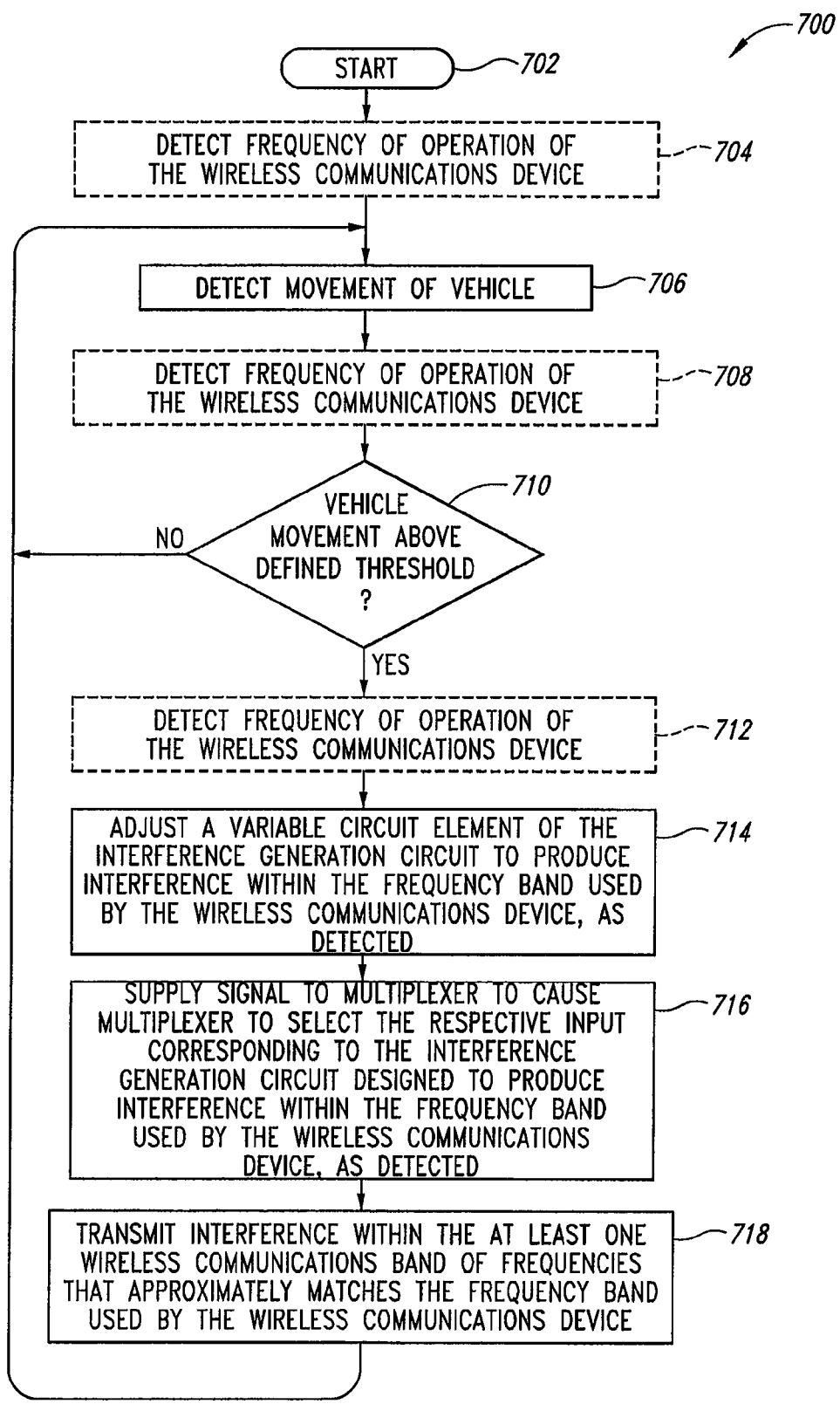
FIG. 7 is a flowchart of a method of disabling operation of wireless communications devices within the vehicle, according to one illustrated embodiment.

FIG. 7 shows a flowchart of a method 700 of disabling operation of the wireless communications devices 6 within the vehicle 8, according to one illustrated embodiment.

The method 700 starts at 702, for example in response to the starting up or movement of the vehicle 8. Optionally at 704, in the event that the wireless communications device 6 is in use, the frequency detector 40 detects the frequency of operation of the wireless communications device 6.

At 706, the sensor 16 sends the signal indicative of the movement of the vehicle 8 to the drive circuit 12. The signal may be indicative of position, speed and/or acceleration of the vehicle 8 or a component thereof, for example, a drive shaft or axle.

Optionally at 708, in the event that the wireless communications device 6 is in use, the frequency detector 40 detects the frequency of operation of the wireless communications device 6.

At 710, at least one of the comparator 24 or the switch 22 determines whether the movement of the vehicle 8 exceeds the defined threshold. As discussed above, the threshold may be defined via the threshold input 26 or the turn-on threshold of the switch 22. As described above, the signal indicative of the movement of the vehicle 8 is compared to the defined threshold. If it is determined that the vehicle 8 is moving below the defined threshold, control passes to 706.

Optionally at 712, in the event that the wireless communications device 6 is in use, the frequency detector 40 detects the frequency of operation of the wireless communications device 6.

Optionally at 714, based upon a signal generated by the frequency detector, the at least one variable circuit element 37 of the interference generation circuit 18 is adjusted to produce interference within the at least one wireless communications band of frequencies that approximately matches the frequency band used by the wireless communications device 6, as detected.

Optionally at 716, a signal is supplied to the multiplexer 36, for example, from the frequency detector 40 to cause the multiplexer 36 to select the respective input corresponding to the interference generation circuit 18 designed to produce interference within the at least one wireless communications band of frequencies that approximately matches the frequency band used by the wireless communications device 6, as detected.

At 718, the at least one of the comparator 24 or switch 22 triggers the interference generation circuit 18 to cause the active antenna element 14 to produce interference within the at least one wireless communications band of frequencies that approximately matches the frequency band used by the wireless communications device 6, as detected. If there are at least two interference generation circuits 18 in the drive circuit 12 then the at least one of the comparator 24 or switch 22 may trigger each of the at least two interference generation circuits 18 to generate interference within the respective wireless communications band of frequencies to the respective input of the multiplexer 36. The multiplexer 36 selects the respective input corresponding to the interference generation circuit 18 designed to cause the active antenna element 14 to produce interference within the at least one wireless communications band of frequencies that approximately matches the frequency band used during operation of the wireless communications device 6. The interference is transmitted by the active antenna element 14 at sufficient power to interfere with communication between the wireless communications device 6 and the destination device 4.

The method 700 passes control to 706 and waits for the signal indicative of the movement of the vehicle 8 to be above the defined threshold.

It will be apparent to those of skill in the art, that the acts of the method 700 may be performed in a different order. It will also be apparent to those with skill in the art, that the method 700 omits some acts and/or may include additional acts.

Figure 8:
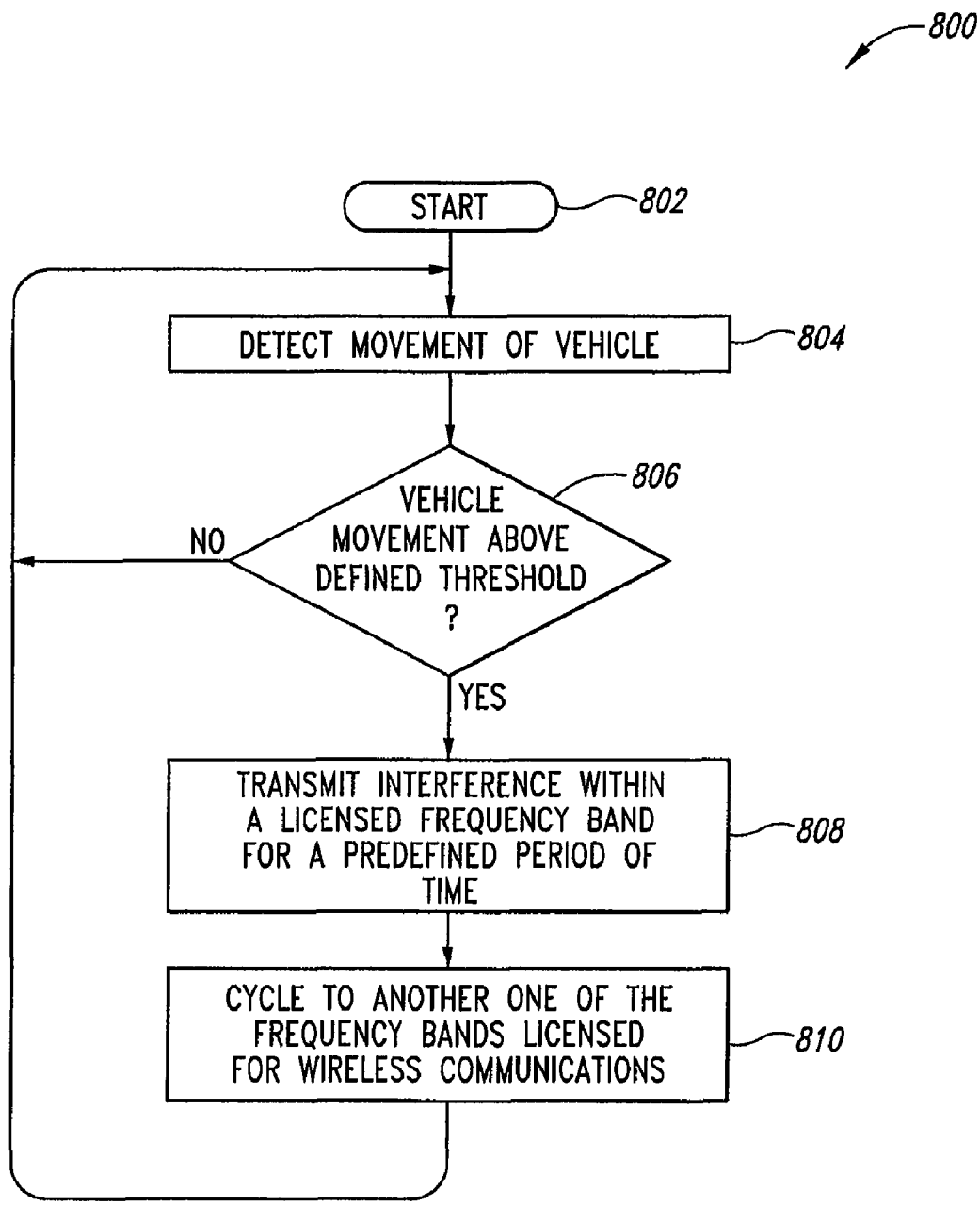
FIG. 8 is a flowchart of a method of disabling operation of wireless communications devices within the vehicle, according to one illustrated embodiment.

FIG. 8 shows a flowchart of a method 800 of disabling operation of the wireless communications devices 6 within the vehicle 8, according to one illustrated embodiment.

The method 800 starts at 802, for example in response to the starting up or movement of the vehicle 8. At 804, the sensor 16 sends the signal indicative of the movement of the vehicle 8 to the drive circuit 12. The signal may be indicative of position, speed and/or acceleration of the vehicle 8 or a component thereof, for example, a drive shaft or axle.

At 806, at least one of the comparator 24 or the switch 22 determines whether the movement of the vehicle 8 exceeds the defined threshold. As discussed above, the threshold may be defined via the threshold input 26 or the turn-on threshold of the switch 22. As described above, the signal indicative of the movement of the vehicle 8 is compared to the defined threshold. If it is determined that the vehicle 8 is moving below the defined threshold, control passes back to 804.

At 808, the interference device 10 transmits interference within one of the frequency bands licensed for wireless communications in the geographic location in which the vehicle 8 is operated. The interference device 10 transmits the interference within the selected frequency band for a predefined period of time.

At 810, the interference device 10 cycles to another one of the frequency bands licensed for wireless communications, different from the selected frequency band at 808.

The method 800 passes control to 804 and waits for the signal indicative of the movement of the vehicle 8 to be above the defined threshold.

It will be apparent to those of skill in the art, that the acts of the method 800 may be performed in a different order. It will also be apparent to those with skill in the art, that the method 800 omits some acts and/or may include additional acts.

Figure 9:
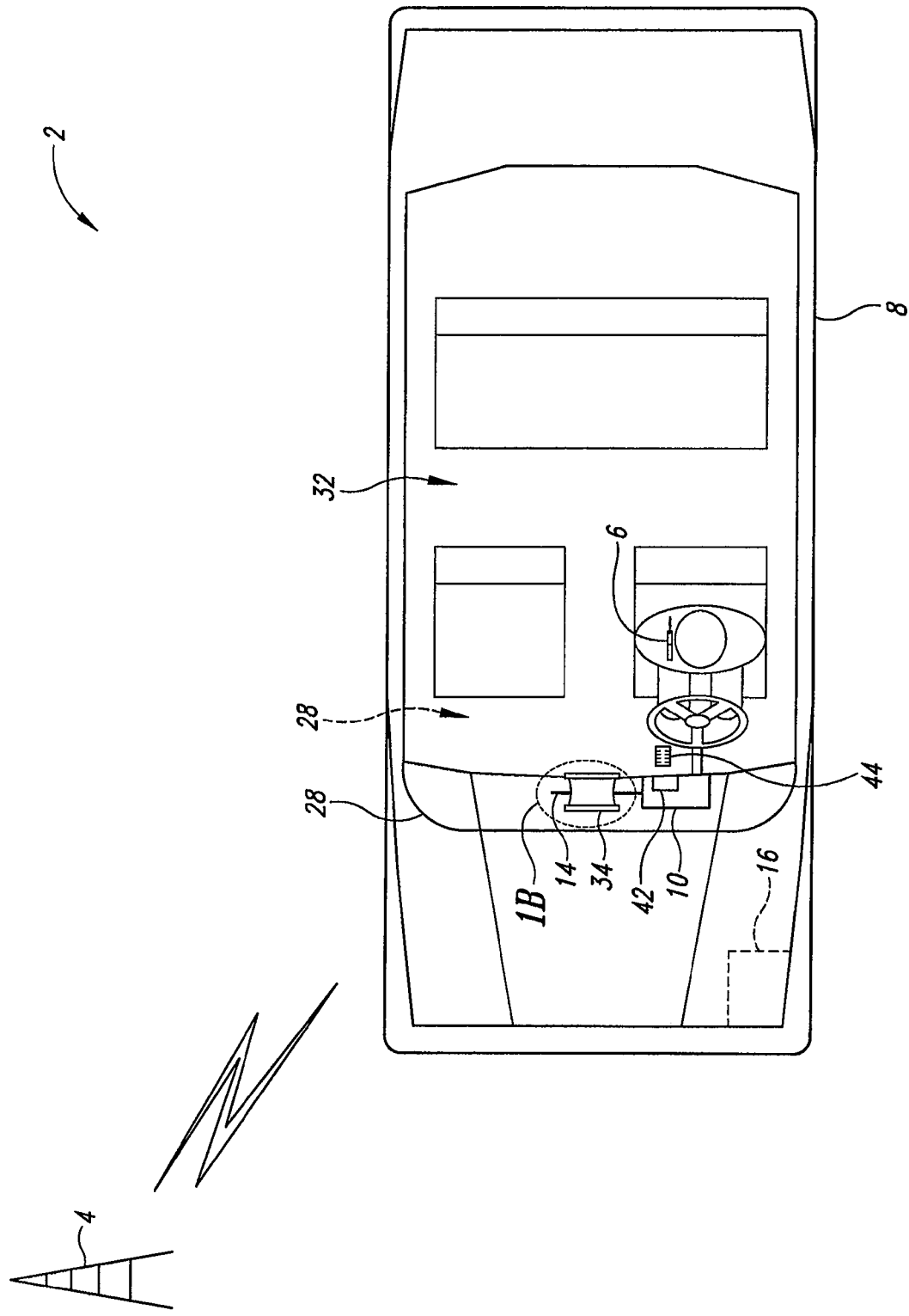
FIG. 9 is a schematic illustration of a communications system including an interference device having a disable circuit embedded therein and positioned within a vehicle, according to one illustrated embodiment.

FIG. 9 shows a schematic illustration of the communications system 2 including the interference device 10 having a disable circuit 42 embedded therein and positioned within the vehicle 8, according to one illustrated embodiment.

The disable circuit 42 is operable to selectively disable the drive circuit 12 (FIG. 2) while the vehicle is moving above the defined threshold (e.g., 5 miles per hour, 2.5 miles per hour, etc.), thereby allowing use of a wireless communications device in certain circumstances.

In one embodiment, the disable circuit 42 receives an input indicating a desired phone call destination (e.g., phone number, exchange, person or entity). In response to a determination that the desired phone call destination is, for example, an emergency service provider and/or another authorized destination, the disable circuit 42 disables the drive circuit 12 from driving the at least one active antenna element 14 to transmit interference (e.g., bare carrier wave, noise or undesired signal imposed on carrier wave) within the wireless communications band of frequencies.

Additionally, or alternatively, the disable circuit 42 may be configured to allow the disabling of the drive circuit 12 for a set amount of time (i.e., disable time limit) during the life of the interference device 10 and/or during a defined period (e.g., week, month, year). The disable time limit may be set during manufacture of the disable circuit 42 or may be set prior to, or during, installation. The disable circuit 42 tracks an accumulated amount of disabled time, indicative of a total amount of time that the drive circuit 12 has been disabled during the life of the interference device 10 and/or during the defined period.

In one embodiment, the disable circuit 42 disables the drive circuit 12 if the accumulated amount of disabled time does not exceed the disable time limit for the life of the interference device 10 or the set period. In another embodiment, in response to a determination that a desired phone call destination is an authorized destination (e.g., emergency service provider or defined emergency contact destination), the disable circuit 42 disables the drive circuit 12 if the accumulated amount of disabled time does not exceed the disable time limit for the life of the interference device 10 and/or for the set period.

Additionally, or alternatively, the disable circuit 42 tracks an accumulated number of disabled times indicative of the number of times that the driving circuit 12 has been disabled during the life of the interference device 10 and/or during the defined period.

In one embodiment, the disable circuit 42 disables the drive circuit 12 if the accumulated number of disabled times does not exceed a set number of times that the device has been disabled (i.e. disabled number of times limit) for the life of the interference device 10 or for a set period of time (e.g., week, month, year). In another embodiment, in response to a determination that a desired phone call destination is an authorized destination (e.g., emergency service provider or defined emergency contact destination), the disable circuit 42 disables the drive circuit 12 if the accumulated number of disabled times does not exceed the disabled number of times limit for the life of the interference device 10 and/or the set period.

Additionally, or alternatively, a disable key 44 may be employed to cause the disable circuit 42 to disable the drive circuit 12. For example, the disable key 44 may be physically or communicatively coupled to the disable circuit 42 to selectively disable the drive circuit 12 and stop the drive circuit 12 from driving the at least one active antenna element 14 to produce the interference while the vehicle 8 is moving above the defined threshold. The disable circuit 42 is further operable to determine whether the disable key 44 is present by determining whether the disable key 44 is physically or communicatively (e.g., wirelessly, such as RF, IR, inductively, photonically, etc) coupled thereto or whether the disable key 44 has been entered (e.g., via keys of a keypad).

The disable circuit 42 may track an accumulated number of disabled times indicative of a total number of times that the disable key 44 has been physically or communicatively coupled to the disable circuit 42 during the life of the interference device 10 and/or during the defined period. The number of disabled times may be equivalent to a number of times the disable key 44 has been physically or communicatively coupled to the disable circuit 42 during the life of the interference device 10 or within the defined period. The number of disabled times may be equivalent to a number of times the disable key 44 has been entered into the disable circuit 42 or associated user interface (e.g., keypad, touch screen, etc) during the life of the interference device 10 and/or during the defined period.

In one embodiment, the disable circuit 42 does not disable the driving of the at least one active antenna element 14 in response to a determination that the accumulated number of disabled times exceeds the disabled number of times limit for the life of the interference device 10 and/or for the defined period.

Additionally, or alternatively, the disable circuit 42 may track an accumulative amount of disable time indicative of a total amount of time the disable key 44 has been physically or communicatively coupled to the disable circuit 42 during the life of the interference device 10 and/or during the defined period. The accumulative amount of disable time may be equivalent to an amount of time the disable key 44 has been physically or communicatively coupled to the disable circuit 42 during the life of the interference device 10 and/or during the defined period.

In one embodiment the disable circuit 42 does not disable the driving of the at least one active antenna element 14 in response to a determination that the accumulated amount of disable time exceeds a disabled time limit for the life of the interference device 10 and/or for the defined period (e.g., week, month, year).

Figure 10:
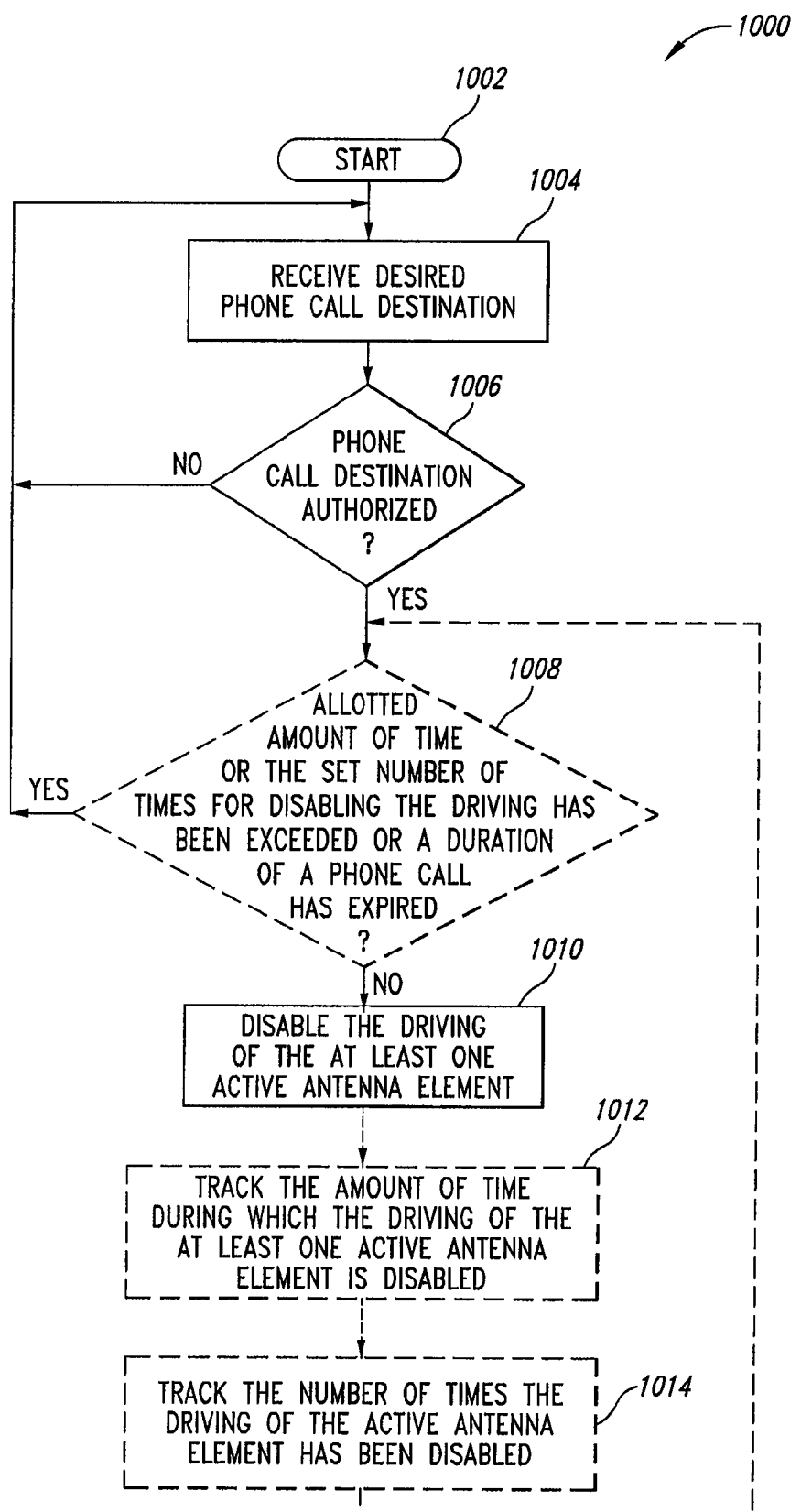
FIG. 10 is a flowchart of a method of selectively disabling driving of at least one active antenna element to stop interference while a vehicle is moving above a defined threshold, according to one illustrated embodiment.

FIG. 10 shows a flowchart of a method 1000 of selectively disabling the driving of the at least one active antenna element 14 to stop the interference while the vehicle 8 is moving above the defined threshold, according to one illustrated embodiment.

The method 1000 starts at 1002, for example in response to the driving of the at least one active antenna element 14 to produce the interference within the at least one wireless communications band of frequencies, while the vehicle 8 is moving above the defined threshold.

At 1004, the disable circuit 42 receives the input indicating the desired phone call destination. At 1006, in response to the determination that the desired phone call destination is an authorized destination such as an emergency service provider and/or a pre-defined emergency contact destination, control passes to 1008. Otherwise, control passes back to 1004.

Optionally at 1008, the disable circuit 42 determines whether the set amount of disable time limit or the set number of disabled times limit for disabling the driving during either the life of the interference device 10 or the defined period has been exceeded, or whether a duration of a phone call between the wireless communications device 8 and the phone call destination has expired. In response to the determination that the set amount of disable time limit or the set number of disabled times limit has not been exceeded or the duration of the phone call between the wireless communications device 8 and the phone call destination has not expired, control passes to 1010. Otherwise, the method 1000 passes control to 1004 and waits for the disable circuit 42 to receive another input indicating another desired phone call destination.

At 1010, the disable circuit 42 disables the driving of the at least one active antenna element 14 to stop interference while the vehicle 8 is moving above the defined threshold. The driving of the at least one active antenna element 14 is disabled until either the duration of the phone call has expired, or the set amount of disable time limit or the set number of disabled times limit for disabling the drive circuit 12 during either the life of the interference device 10 or the defined period has been exceeded. In some embodiments, the disable circuit 42 will continue to disable the interference device 10 even after the set amount of disable time limit or the set number of disabled times limit has been exceeded, but will then prevent further calls while the vehicle is operating above the defined threshold.

Optionally, at 1012, the disable circuit 42 tracks the accumulated amount of disable time indicative of the amount of time during which the disable circuit 42 has disabled the driving of the at least one active antenna element 14 for the life time of the interference device 10 and/or the define period.

Optionally, at 1014, the disable circuit 42 tracks the accumulated number of disabled times indicative of the number of times the disable circuit 42 has disabled the driving of the at least one active antenna element 14 during the life time of the interference device 10 and/or the define period. The method passes control back to 1008 to determine whether the duration of the phone call has expired, or the set amount of disable time limit or the set number of disabled times limit has been exceeded for either the life of the interference device 10 and/or defined period.

It will be apparent to those of skill in the art, that the acts of the method 1000 may be performed in a different order. It will also be apparent to those with skill in the art, that the method 1000 omits some acts and/or may include additional acts.

Figure 11:
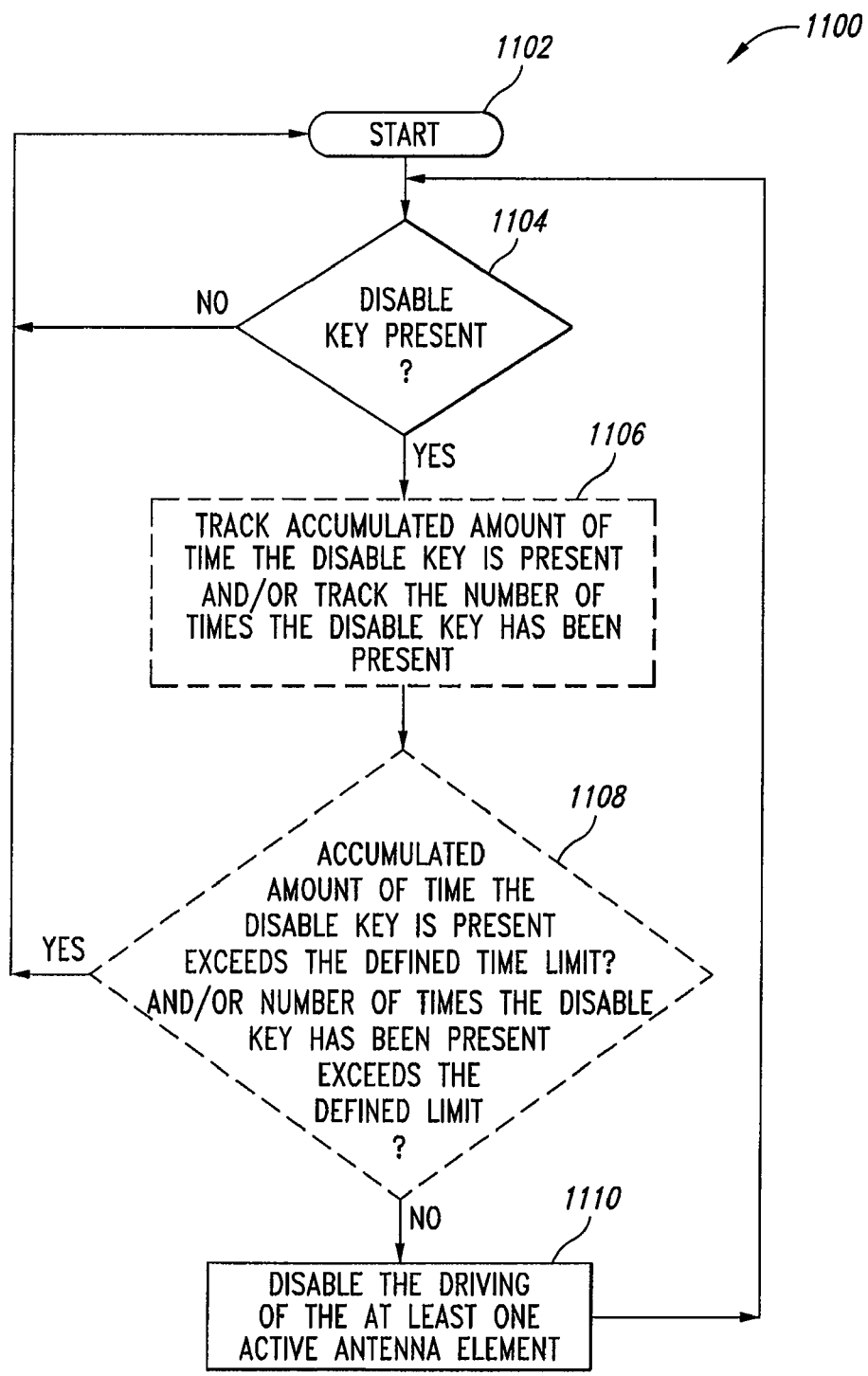
FIG. 11 is a flowchart of a method of selectively disabling driving of at least one active antenna element to stop interference while a vehicle is moving above a defined threshold, according to another illustrated embodiment.

FIG. 11 shows a flowchart of a method 1100 of selectively disabling the driving of the at least one active antenna element 14 to stop the interference while the vehicle 8 is moving above the defined threshold, according to one illustrated embodiment.

The method 1100 starts at 1102, for example in response to the driving of the at least one active antenna element 14 to produce the interference within the at least one wireless communications band of frequencies while the vehicle 8 is moving above the defined threshold.

At 1104, the disable circuit 42 determines whether the disable key 44 is present by determining whether the disable key 44 is physically or communicatively coupled to, or entered into, the disable circuit 42. If the disable key 44 is physically or communicatively coupled to, or entered into, the disable circuit 44, control passes to 1106. Otherwise, the method 1100 passes control to 1102 and waits for the driving of the at least one active antenna element 14 to produce the interference within the at least one wireless communications band of frequencies while the vehicle 8 is moving above the defined threshold.

Optionally at 1106, the disable circuit 42 tracks the accumulated amount of disabled time that the disable key 44 is coupled thereto and/or tracks the number of times the disable key 44 has been present or entered. Optionally at 1108, in response to a determination that the accumulated amount of time the disable key 42 is present exceeds the set amount of disable time and/or the number of times the disable key 44 has been present exceeds the set number of disabled times limit, the drive circuit 12 does not disable the driving of the at least one active antenna element 14 and control passes back to 1102. Otherwise control passes to 1110.

At 1110, the disable circuit 42 disables the driving of the at least one active antenna element 14 to stop interference while the vehicle 8 is moving above the defined threshold.

The method 1100 passes control to 1104 to determine whether the disable key 44 is physically or communicatively coupled to or entered into the disable circuit 44.

It will be apparent to those of skill in the art, that the acts of the method 1100 may be performed in a different order. It will also be apparent to those with skill in the art, that the method 1100 omits some acts and/or may include additional acts.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An apparatus operable to disable operation of wireless communications devices, for use within a vehicle, the apparatus comprising:

at least one active antenna element;

a drive circuit coupled to drive the at least one active antenna element to produce interference within at least one wireless communications band of frequencies at sufficient power to interfere with communication between the wireless communications device and a destination device; and a disabling circuit responsive to at least an allotted amount of time for disabling the driving of the at least one active antenna element during a defined period to selectively disable the drive circuit from the driving of the at least one active antenna element, the drive circuit and the disabling circuit cooperatively operable to interfere with communication between the wireless communications device and the destination device while the vehicle is moving above a defined threshold and the allotted amount of time for disabling the driving of the at least one active antenna element during the defined period has been exceeded and to not interfere with the communication between the wireless communications device and the destination device while the vehicle is moving above the defined threshold and the allotted amount of time for disabling the driving of the at least one active antenna element during the defined period has not been exceeded.

2. The apparatus of claim 1 wherein the drive circuit comprises an input port coupleable to receive a signal indicative of the movement of the vehicle.

3. The apparatus of claim 1 wherein the drive circuit comprises an input port coupled to at least one of a speedometer, tachometer or a rotational encoder to receive a signal indicative of the movement of the vehicle.

4. The apparatus of claim 1 wherein the drive circuit comprises an acceleration sensor operable to provide a signal indicative of the movement of the vehicle.

5. The apparatus of claim 1 wherein the drive circuit comprises a comparator configured to compare a signal indicative of the movement of the vehicle with a threshold value.

6. The apparatus of claim 1 wherein the drive circuit comprises a comparator configured to compare a signal indicative of the movement of the vehicle with a threshold value of approximately 5 miles per hour.

7. The apparatus of claim 1 wherein the drive circuit comprises a comparator configured to compare a signal indicative of the movement of the vehicle with a user set threshold value.

8. The apparatus of claim 1 wherein the drive circuit is operable to drive the at least one active antenna element to produce interference within at least two distinct wireless communications bands of frequencies in response to the movement of the vehicle above the defined threshold.

9. The apparatus of claim 8 wherein the wireless communications bands of frequencies include at least two selected from the group consisting of an 800 MHz band, a 900 MHz band, an 1800 MHz band, and a 1900 MHz band.

10. The apparatus of claim 1 wherein the drive circuit comprises at least two interference generation circuits, each operable to cause the at least one active antenna element to produce interference within a respective one of at least two wireless communications band of frequencies.

11. The apparatus of claim 10 wherein the drive circuit comprises a multiplexer operable to selectively couple a respective one of the at least two interference generation circuits to the active antenna element at a time.

12. The apparatus of claim 1 wherein the drive circuit is reconfigurable to drive the at least one active antenna element to produce interference within a new wireless communications band of frequencies, different from the at least one band of wireless communications frequencies in response to a reconfiguration input.

13. The apparatus of claim 1 wherein the active antenna element is a directional antenna element.

14. The apparatus of claim 1 wherein the active antenna element is a directional antenna element with a primary axis of radiation, the active antenna element mountable proximate a dashboard of the vehicle with the primary axis of radiation directed into a passenger compartment of the vehicle.

15. The apparatus of claim 1, further comprising:
a passive antenna element positioned with respect to the active antenna element to produce a directional radiation pattern, wherein the active and the passive antenna elements are mountable proximate a dashboard of the vehicle with a primary axis of the directional radiation pattern directed into a passenger compartment of the vehicle when the active and the passive antenna elements are mounted proximate the dashboard.

16. The apparatus of claim 15 wherein the passive antenna element is a portion of a cylinder, with a longitudinally extending slot extending a length thereof.

17. The apparatus of claim 1 wherein the drive circuit is operable to produce a carrier wave within at least one wireless communications band of frequencies, without any signal or noise imposed on the carrier wave.

18. The apparatus of claim 1 wherein the drive circuit is operable to produce noise in at least one wireless communications band of frequencies.

19. The apparatus of claim 1 wherein the disabling circuit is operable to receive an input indicative of a destination for a phone call and to disable the drive circuit from the driving of the at least one active antenna element at least in part in response to a determination that the destination for the phone call is an authorized destination that is not an emergency service provider.

20. The apparatus of claim 1 wherein the disabling circuit is operable to receive an input indicative of a destination for a phone call and to disable the drive circuit from the driving of the at least one active antenna element in response to a determination that the destination for the phone call is an emergency service provider.

21. The apparatus of claim 1 wherein the disabling circuit is operable to receive an input indicative of a destination for a phone call and to disable the drive circuit from the driving of the at least one active antenna element in response to a determination that the destination for the phone call is a pre-identified emergency contact destination when the allotted amount of time for disabling the driving during the period has not been exceeded.

22. The apparatus of claim 1 wherein the disabling circuit is operable to track an amount of time during which the driving of the at least one antenna element is disabled.

23. The apparatus of claim 1 wherein the disabling circuit is operable to track an amount of time during which the driving of the at least one antenna is disabled during the defined period.

24. The apparatus of claim 1 wherein the disabling circuit determines whether a disable key is present.

25. The apparatus of claim 24 wherein the disabling circuit determines whether the disable key is coupled thereto.

26. An apparatus operable to disable operation of wireless communications devices, for use within a vehicle, the apparatus comprising:
at least one active antenna element;
a drive circuit coupled to drive the at least one active antenna element to produce interference within at least one wireless communications band of frequencies at sufficient power to interfere with communication between the wireless communications device and a destination device; and
a disabling circuit to selectively disable the drive circuit from the driving of the at least one active antenna element while the vehicle is moving above a defined threshold, wherein the disabling circuit determines whether a disable key is present and tracks an accumulated amount of time the disable key is present, the drive circuit and the disabling circuit cooperatively operable to selectively interfere with communication between the wireless communications device and the destination device based at least in part on whether the vehicle is moving above the defined threshold and the accumulated amount of time that the disable key is present.

27. The apparatus of claim 26 wherein the disabling circuit does not disable the drive circuit from the driving of the at least one active antenna element in response to a determination that the accumulated amount of time that the disable key is present does not exceed a defined time limit.

28. An apparatus operable to disable operation of wireless communications devices, for use within a vehicle, the apparatus comprising:
at least one active antenna element;
a drive circuit coupled to drive the at least one active antenna element to produce interference within at least one wireless communications band of frequencies at sufficient power to interfere with communication between the wireless communications device and a destination device; and
a disabling circuit to selectively disable the drive circuit from the driving of the at least one active antenna element, wherein the disabling circuit is operable to determine whether a disable key is present and a number of times the disable key has been present, the drive circuit and the disabling circuit cooperatively operable to interfere with communication between the wireless communications device and the destination device while the vehicle is moving above a defined threshold and the number of times the disable key has been present exceeds a defined limit and to not interfere with communication between the wireless communications device and the destination device while the vehicle is moving above the defined threshold and the number of times the disable key has been present does not exceed the defined limit.

29. The apparatus of claim 28 wherein the number of times the disable key is present is equivalent to a number of times the disable key has been coupled to a disabling circuit within a predefined period.

30. The apparatus of claim 28 wherein the number of times the disable key is present is equivalent to a number of times the disable key has been entered.

31. A method to disable operation of wireless communications devices within vehicles, the method comprising:
determining whether a vehicle is moving above a defined threshold;
driving at least one active antenna element to produce interference within at least one wireless communications band of frequencies in response to a determination that the vehicle is moving above the defined threshold; and
selectively disabling the driving of the at least one active antenna element to stop the interference while the vehicle is moving above the defined threshold at least in part in response to a determination that an allotted amount of time for disabling the driving of the at least one active antenna element during a defined period has not been exceeded.

32. The method of claim 31 wherein determining whether the vehicle is moving above the defined threshold comprises receiving a signal from a sensor of the vehicle indicative of a speed of the vehicle and comparing the signal indicative of the speed of the vehicle to a speed threshold.

33. The method of claim 31 wherein determining whether the vehicle is moving above the defined threshold comprises receiving a signal from a sensor of the vehicle indicative of an acceleration of the vehicle and comparing the signal indicative of the acceleration of the vehicle to an acceleration threshold.

34. The method of claim 31 wherein determining whether the vehicle is moving above the defined threshold comprises detecting an acceleration of the vehicle and comparing the acceleration of the vehicle to an acceleration threshold.

35. The method of claim 31 wherein selectively disabling the driving of the at least one active antenna element to stop the interference while the vehicle is moving above the defined threshold includes receiving an input indicative of a destination for a phone call and the disabling of the driving of the at least one active antenna element is responsive at least in part to a determination that the destination for the phone call is an authorized destination.

36. The method of claim 31 wherein selectively disabling the driving of the at least one active antenna element to stop the interference while the vehicle is moving above the defined threshold includes receiving an input indicative of a destination for a phone call and the disabling of the driving of the at least one active antenna element is responsive at least in part to a determination that the destination for the phone call is an emergency service provider.

37. The method of claim 31 wherein selectively disabling the driving of the at least one active antenna element to stop the interference while the vehicle is moving above the defined threshold includes receiving an input indicative of a destination for a phone call and the disabling of the driving of the at least one active antenna element is responsive at least in part to a determination that the destination for the phone call is a pre-identified emergency contact destination that is not an emergency service provider.

38. The method of claim 31, further comprising:
tracking an amount of time during which the driving of the at least one antenna element is disabled.

39. The method of claim 31, further comprising:
tracking an amount of time during which the driving of the at least one antenna element is disabled during the defined period.

40. The method of claim 31, further comprising:
determining whether a disable key is present.

41. The method of claim 31 wherein driving at least one active antenna element to produce interference within at least one wireless communications band of frequencies comprises driving the at least one active antenna element to produce interference within at least two distinct wireless communications bands of frequencies.

42. The method of claim 31 wherein driving at least one active antenna element to produce interference within at least one wireless communications band of frequencies comprises selectively coupling a respective one of at least two interference generation circuits to the active antenna element at a time.

43. The method of claim 31 wherein driving at least one active antenna element to produce interference within at least one wireless communications band of frequencies comprises driving the at least one active antenna element to produce interference within a new wireless communications band of frequencies, different from the at least one band of wireless communications frequencies in response to a reconfiguration input.

44. The method of claim 31 wherein driving at least one active antenna element to produce interference within at least one wireless communications band of frequencies comprises producing a directional radiation pattern from a position proximate a dashboard of the vehicle with a primary axis of the directional radiation pattern directed into a passenger compartment of the vehicle.

45. The method of claim 31 wherein driving at least one active antenna element to produce interference within at least one wireless communications band of frequencies comprises producing interference at sufficient power to interfere with communication between the wireless communications device and a destination device.

46. The method of claim 31 wherein driving at least one active antenna element to produce interference within at least one wireless communications band of frequencies comprises producing a bare carrier wave at sufficient power to interfere with communication between the wireless communications device and a destination device.

47. A method to disable operation of wireless communications devices within vehicles, the method comprising:
determining whether a vehicle is moving above a defined threshold;
determining whether a disable key is present;
tracking an accumulated amount of time that the disable key is presents;

driving at least one active antenna element to produce interference within at least one wireless communications band of frequencies in response to a determination that the vehicle is moving above the defined threshold and the accumulated amount of time that the disable key is present exceeds a defined time limit;

selectively disabling the driving of the at least one active antenna element to stop the interference while the vehicle is moving above the defined threshold in response to a determination that the accumulated amount of time that the disable key is present does not exceed the defined time limit.

48. The method of claim 47 wherein determining whether a disable key is present includes determining whether the disable key is physically coupled to a disable circuit.

49. The method of claim 47, further comprising not disabling the driving of the at least one active antenna element in response to a determination that the accumulated amount of time that the disable key is present exceeds the defined time limit.

50. A method to disable operation of wireless communications devices within vehicles, the method comprising:
determining whether a vehicle is moving above a defined threshold;
determining a number of times that a disable key has been present;
driving at least one active antenna element to produce interference within at least one wireless communications band of frequencies in response to a determination that the vehicle is moving above the defined threshold and that the number of times the disable key has been present does exceed a defined limit;
selectively disabling the driving of the at least one active antenna element to stop the interference while the vehicle is moving above the defined threshold in response to a determination that the number of times that the disable key has been present does not exceed the defined limit.

51. The method of claim 50 wherein determining the number of times that the disable key has been present includes determining the number of times the disable key has been coupled to a disable circuit within a defined period.

52. An apparatus operable to disable operation of wireless communications devices, for use within a vehicle, the apparatus comprising:
at least one active antenna element;
drive means for driving the at least one active antenna element to produce interference within at least one wireless communications band of frequencies at sufficient power to interfere with communication between the wireless communications device and a destination device; and
disabling means for selectively disabling the drive means responsive at least in part to an allotted amount of time for disabling the drive means, the drive means and the disabling means cooperatively operable to interfere with communication between the wireless communications device and the destination device while the vehicle is moving above a defined threshold and the allotted amount of time for disabling the drive means during a defined period has been exceeded and to not interfere with the communication between the wireless communications device and the destination device while the vehicle is moving above the defined threshold and the allotted amount of time for disabling the drive means during the defined period has not been exceeded.

53. The apparatus of claim 52 wherein the drive means comprises a drive circuit having a switch responsive to movement of the vehicle above the defined threshold to selectively couple an interference generation circuit to the at least one active antenna element to produce interference within the at least one wireless communications band of frequencies at sufficient power to interfere with communication between the wireless communications device and the destination device.

54. The apparatus of claim 53 wherein the switch is coupled to receive a signal indicative of the movement of the vehicle.

55. The apparatus of claim 53 wherein the switch is coupled to at least one of a speedometer, tachometer or a rotational encoder to receive a signal indicative of the movement of the vehicle.

56. The apparatus of claim 53 wherein the drive circuit comprises an acceleration sensor operable to provide a signal indicative of the movement of the vehicle.

57. The apparatus of claim 53 wherein the drive circuit is operable to drive the at least one active antenna element to produce interference within at least two distinct wireless communications bands of frequencies in response to movement of the vehicle above the defined threshold.

58. The apparatus of claim 53 wherein the drive circuit comprises at least two interference generation circuits, each operable to cause the at least one active antenna element to produce interference within a respective one of at least two wireless communications band of frequencies.

59. The apparatus of claim 53 wherein the drive circuit is reconfigurable to drive the at least one active antenna element to produce interference within a new wireless communications band of frequencies, different from the at least one band of wireless communications frequencies in response to a reconfiguration input.

60. The apparatus of claim 52 wherein the disabling means is operable to receive an input indicative of a destination for a phone call and to disable the drive means from the driving of the at least one active antenna element in response to a determination that the destination for the phone call is an authorized destination.

61. The apparatus of claim 52 wherein the disabling means is operable to receive an input indicative of a destination for a phone call and to disable the drive means from the driving of the at least one active antenna element in response to a determination that the destination for the phone call is an emergency service provider.

62. The apparatus of claim 52 wherein the disabling means is operable to receive an input indicative of a destination for a phone call and to disable the drive means from the driving of the at least one active antenna element at least in part in response to a determination that the destination for the phone call is a pre-identified emergency contact destination when the allotted amount of time for disabling the driving during the period has not been exceeded.

63. The apparatus of claim 52 wherein the disabling means is operable to track an amount of time during which the driving of the at least one antenna element is disabled.

64. The apparatus of claim 52 wherein the disabling means is operable to track an amount of time during which the driving of the at least one antenna element is disabled during the defined period.

65. The apparatus of claim 52 wherein the disabling means determines whether a key is present.

66. The apparatus of claim 65 wherein the disabling means determines whether the key is coupled thereto.

67. An apparatus operable to disable operation of wireless communications devices, for use within a vehicle, the apparatus comprising:
- at least one active antenna element;
- drive means for driving the at least one active antenna element to produce interference within at least one wireless communications band of frequencies at sufficient power to interfere with communication between the wireless communications device and a destination device; and
- disabling means for selectively disabling the drive means, wherein the disabling means tracks an accumulated amount of time a key is present, the drive means and the disabling means cooperatively operable to interfere with communication between the wireless communications device and the destination device while the vehicle is moving above a defined threshold and the accumulated amount of time the key is present has been exceeded and to not interfere with the communication between the wireless communications device and the destination device while the vehicle is moving above the defined threshold and the accumulated amount of time the key is present has not been exceeded.

68. The apparatus of claim 67 wherein the disabling means does not disable the driving means from the driving of the at least one active antenna element in response to a determination that the accumulated amount of time that the key is present exceeds a defined time limit.

69. An apparatus operable to disable operation of wireless communications devices, for use within a vehicle, the apparatus comprising:
- at least one active antenna element;
- drive means for driving the at least one active antenna element to produce interference within at least one wireless communications band of frequencies at sufficient power to interfere with communication between the wireless communications device and a destination device; and
- disabling means for selectively disabling the drive means, wherein the disabling means is operable to determine a number of times a key has been present, the drive means and the disabling means cooperatively operable to interfere with communication between the wireless communications device and the destination device while the vehicle is moving above a defined threshold and the number of times the key has been present exceeds a defined limit and to not interfere with communication between the wireless communications device and the destination device while the vehicle is moving above the defined threshold and the number of times the key has been present does not exceed the defined limit.

70. The apparatus of claim 69 wherein the number of times the key is present is equivalent to a number of times the key has been coupled to a disable circuit within a predefined period.

71. The apparatus of claim 69 wherein the number of times the key is present is equivalent to a number of times the key has been entered.

* * * * *

UNITED STATES PATENT AND TRADEMARK OFFICE
CERTIFICATE OF CORRECTION

PATENT NO. : 8,121,531 B2
APPLICATION NO. : 12/109266
DATED : February 21, 2012
INVENTOR(S) : Craig S. Brown et al.

It is certified that error appears in the above-identified patent and that said Letters Patent is hereby corrected as shown below:

Column 18, Line 67, Claim 47:
"key is presents;" should read, --key is present;--.

Signed and Sealed this
Sixteenth Day of October, 2012

David J. Kappos
*Director of the United States Patent and Trademark Office*